Jan. 28, 1958     W. E. HUMMEL     2,821,130
APPARATUS FOR COATING TIRE WALLS
Filed Oct. 11, 1954
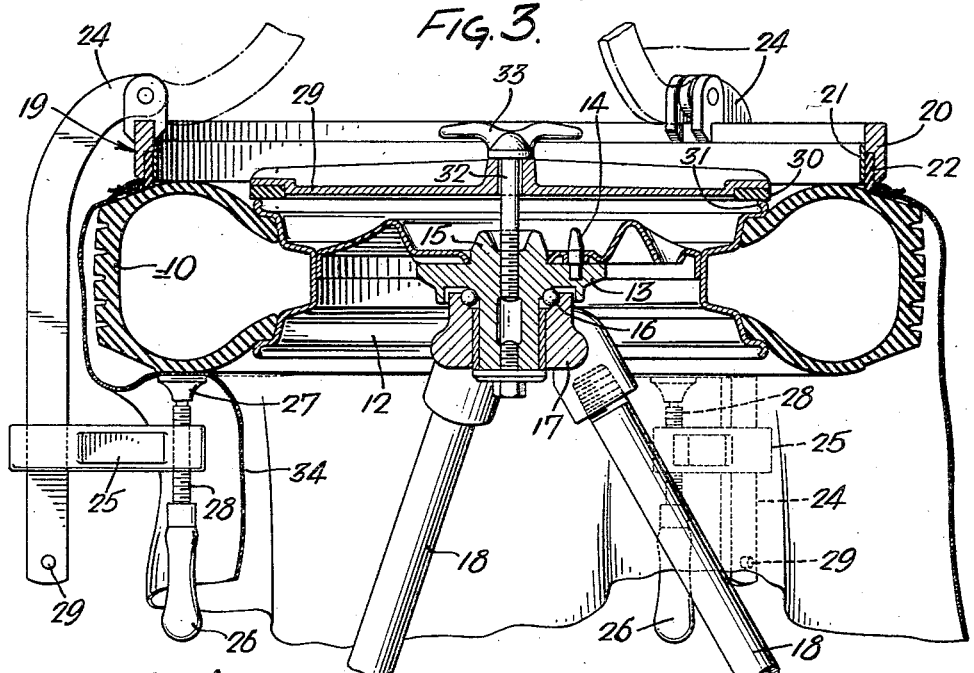
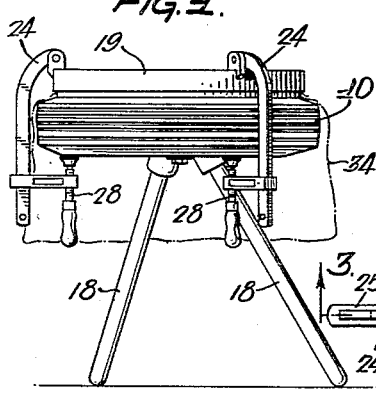
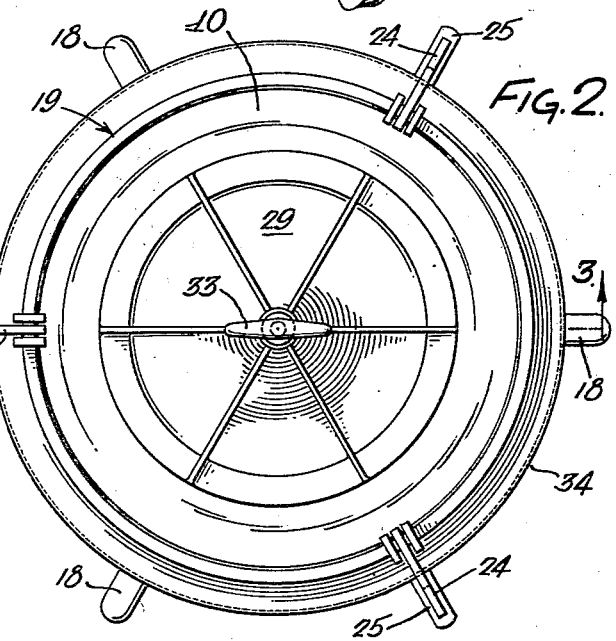
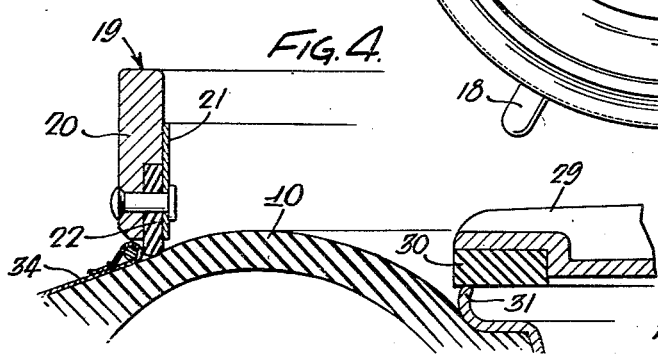

United States Patent Office 2,821,130
Patented Jan. 28, 1958

2,821,130

TIRE SPRAYING APPARATUS

Willi Eugene Hummel, Philadelphia, Pa.

Application October 11, 1954, Serial No. 461,333

4 Claims. (Cl. 101—126)

The present invention relates to apparatus designed to be used in the coating of tires, and was conceived and developed as an improvement to be used in application of coatings to produce white side walls or to renew them when marred or worn.

While the development of tires of the white side wall type has found wide appeal with the public, the considerable increased cost of such tires as factory equipment has operated as a serious drawback to their general adoption.

An object of the invention has been to provide apparatus for the coating of ordinary tires on their side walls which is so economical in its construction and use that tires of the white side wall type may be provided for a fraction of the increased cost heretofore entailed in this substitution.

When tires produced at the factory with white side walls have become marred or worn in the past, these have been revived in their white wall effect by manual application of white coating materials such as paint and this has been a tedious and time-consuming operation. A further object of the invention has accordingly been to provide an apparatus and system for repainting or touching up such tires which can be simply and rapidly applied, thereby providing considerable economy in this type of operation.

A still further object of the invention has been to provide a supporting and masking combination which enables white side wall or other coatings to be applied to the walls of tires with economy, facility and despatch.

Still further objects and advantages of the invention, and the manner in which they have been attained, will be evident from reading of the following detailed description in the light of the attached drawing, in which, Figure 1 is a side elevational view of the apparatus employed in practice of the invention;

Figure 2 is a plan view of the apparatus;

Figure 3 is a cross-section on the line 3—3 of Figure 1, parts being shown in elevation; and Figure 4 is a cross-section similar to Figure 3, illustrating parts of the invention on a larger scale.

As illustrated particularly in Figures 1 and 3 of the drawing, the tire 10 to be coated is secured on a supporting surface, with the side to be coated in an exposed, e. g. upwardly facing, position. For example, the tire may be mounted through its rim and wheel 12 on a circular support 13, and located in definite position on that support by a stud 14 extending upwardly from the support through a bolt hole of the wheel and a central boss 15 on the support receiving the central part of the wheel body. The support 13 may be in turn rotatably mounted by ball bearings 16 upon a pedestal 17 resting upon supporting legs 18.

An annular masking member 19 is provided, corresponding in its inner circumference to the outer circumference of the coating to be applied, and this masking member may comprise outer and inner metal rings 20 and 21, with an elastic and resilient ring 22, which may be of rubber, clamped between them in position such that its lower edge projects beyond their lower edges, as illustrated in Figures 3 and 4.

In use of the apparatus, with the tire supported as discussed above, the masking member 19 is positioned upon the tire wall to be coated, with the inner circumference of the rubber ring 22 at the outer circumference of the portion of the tire wall to be coated. The invention includes clamp supporting means secured to the masking member 19 and extending downwardly around the outer circumference of the tire in use, and this clamp-supporting means may comprise a number of individual brackets secured to the ring 20 and serving as pivotal mountings for arms 24. Clamping means are secured to lower portions of these arms, and these clamping means may comprise a number of individual arms 25 which extend radially inwardly of arms 24 and threadedly support individual clamping screws 28 in positions such that, by manipulation of their handles 26, a clamping jaw 27 at the upper end of each of them may be brought home in clamping relation against the underside of the tire.

The arms 25 may be rigidly secured to the arms 24 at about the locations illustrated, but they are preferably slidably mounted on arms 24 and prevented from loss therefrom by pins 29 projecting laterally from the lower ends of arms 24. The non-vertical force components created by the offset positions of arms 25 and the clamping action are sufficient to maintain these arms in vertically adjusted positions without the necessity of positive securement, and the slidable positioning of arms 25 on arms 24 facilitates quick manipulation and adjustment, in clamping masking ring 19 in place.

A circular plate 29 may be employed to mask the space of the wheel within the coating to be applied, and this plate may carry on its under face in an annular shoulder adjacent its outer circumference, an annular masking ring 30 of rubber or other flexible and elastic material. this ring 30 may rest upon the upper edge 31 of the rim, and the plate 29 be secured in this position by a bolt 32 manipulated by a handle 33 and extending through a central opening in plate 29 into screw-threaded engagement with support 13.

A flexible annular mask 34 may be also mounted about the outer circumferential edge of the ring 22, and surround the outer circumference of the tire in use, so as to prevent accidental application of paint or other coating by spraying against this part of the tire.

The manner in which the invention is used will now be apparent. Assume that the masking ring 19 is removed from the tire-supporting fixture 13, with arms 24 thrown back to the broken line positions of Figure 3, and that the masking plate 29 is similarly removed. Now the wheel 12, with assembled rim 11 and tire 12 is mounted on support 13, with boss 15 entered within the central part of the wheel and stud 14 passing through a bolt hole. Plate 29 is then positioned over the wheel as illustrated, with the annular rubber masking ring 30 resting against the edge 31 of the rim, and bolt 32 is then screwed into place by its handle 33 to secure plate 29 in this position.

Annular masking ring 19 is next carefully positioned as illustrated, and arms 24 are swung outwardly from the dotted line to the full line positions. The clamps are then secured as illustrated, by manipulation of the arms 25 and screws 28. Shroud or mask 34 is positioned about the tire with its inner circumferential bead 35 closely surrounding the masking ring member 22.

The portion of the side wall between rings 22 and 30 is now coated as desired, preferably by spraying, without danger of spraying undesired portions of the tire or wheel. During this operation, the wheel and tire may be rotated either manually or by a suitable driving attachment. When the coating operation is completed, the tire may be removed from the fixture by a series of operations which are reversed as compared to the foregoing discussion.

While only a single embodiment of the invention has been discussed above, persons skilled in the art will recognize that it may be modified and refined in various ways, and I do not therefore intend to be limited except by the scope and spirit of the following claims.

I claim:

1. Apparatus for applying white side walls on tires comprising a pedestal, a circular support rotatably mounted on said pedestal, connecting means on said support for releasably mounting the centrally-apertured hub portion of a wheel on said support, an axially-movable clamping means extending axially from the central portion of said support, a circular masking plate mounted on said clamping means coaxially with said support, the outer periphery of said masking plate being positioned radially outward of said support, said masking plate being movable toward said support into clamping relationship therewith by axial movement of said clamping means, an annular masking ring coaxial with said masking plate and positioned radially outward of the outer periphery of said masking plate and in spaced relationship therewith to define an annular treating area therebetween, a plurality of lever arms, each being hinged at one end to said masking ring and having a lateral bracket thereon, a threaded stem threadedly engaged in each bracket for threaded adjustment in a direction substantially parallel with the corresponding lever arm, a clamping jaw at one end of each of said threaded stems and a manually operable handle at the opposite end of each of said threaded stems.

2. Apparatus for applying white side walls on tires comprising a pedestal, a circular support rotatably mounted on said pedestal, connecting means on said support for releasably mounting the centrally-apertured hub portion of a wheel on said support, an axially-movable clamping means extending axially from the central portion of said support, a circular masking plate mounted on said clamping means coaxially with said support, the outer periphery of said masking plate being positioned radially outward of said support, said masking plate being movable toward said support into clamping relationship therewith by axial movement of said clamping means, an annular masking ring coaxial with said masking plate and positioned radially outward of the outer periphery of said masking plate and in spaced relationship therewith to define an annular treating area therebetween, a plurality of lever arms, each being hinged at one end to said masking ring and having a lateral bracket thereon, a threaded stem threadedly engaged in each bracket for threaded adjustment in a direction substantially parallel with the corresponding lever arm, a clamping jaw at one end of each of said threaded stems, a manually operable handle at the opposite end of each of said threaded stems, said masking plate being provided with a resilient contact ring at its outer periphery and said masking ring being provided with a resilient contact ring at its inner periphery.

3. Apparatus for applying white side walls on tires comprising a pedestal, a circular support rotatably mounted on said pedestal, connecting means on said support for releasably mounting the centrally-apertured hub portion of a wheel on said support, an axially-movable clamping means extending axially from the central portion of said support, a circular masking plate mounted on said clamping means coaxially with said support, the outer periphery of said masking plate being positioned radially outward of said support, said clamping means comprising a bolt having one end threadedly engaged in an axial, threaded opening in said support and having its opposite end extending freely through a central aperture in said masking plate, engagement means between said bolt and said masking plate, and a manually operable handle on said bolt, said masking plate being movable toward said support into clamping relationship therewith by axial movement of said clamping means, an annular masking ring coaxial with said masking plate and positioned radially outward of the outer periphery of said masking plate and in spaced relationship therewith to define an annular treating area therebetween, a plurality of lever arms, each being hinged at one end to said masking ring and having a lateral bracket thereon, a threaded stem threadedly engaged in each bracket for threaded adjustment in a direction substantially parallel with the corresponding lever arm, a clamping jaw at one end of each of said threaded stems, and a manually operable handle at the opposite end of each of said threaded stems.

4. Apparatus for applying white side walls on tires comprising a pedestal, a circular support rotatably mounted on said pedestal, connecting means on said support for releasably mounting the centrally-apertured hub portion of a wheel on said support, an axially-movable clamping means extending axially from the central portion of said support, a circular masking plate mounted on said clamping means coaxially with said support, the outer periphery of said masking plate being positioned radially outward of said support, said masking plate being movable toward said support into clamping relationship therewith by axial movement of said clamping means, an annular masking ring coaxial with said masking plate and positioned radially outward of the outer periphery of said masking plate and in spaced relationship therewith to define an annular treating area therebetween, a plurality of lever arms, each being hinged at one end to said masking ring and having a lateral bracket thereon, a threaded stem threadedly engaged in each bracket for threaded adjustment in a direction substantially parallel with the corresponding lever arm, a clamping jaw at one end of each of said threaded stems, a manually operable handle at the opposite end of each of said threaded stems, and each lateral bracket being slidably adjustable on its corresponding lever arm and having sufficient frictional contact therewith to hold the bracket in adjusted position while permitting slidable relationship therebetween.

References Cited in the file of this patent

UNITED STATES PATENTS

| 160,911 | Howdon | Mar. 16, 1875 |
| 1,424,199 | Humelbau | Aug. 1, 1922 |
| 1,690,346 | Ross et al. | Nov. 6, 1928 |
| 1,692,920 | Baker | Nov. 27, 1928 |
| 1,741,997 | Lerch | Dec. 31, 1929 |
| 1,782,541 | McClellan | Nov. 25, 1930 |
| 2,078,366 | Bound | Apr. 27, 1937 |
| 2,371,859 | Wallace | Mar. 20, 1945 |
| 2,627,839 | Hudgins et al. | Feb. 10, 1953 |
| 2,634,704 | Morrison | Apr. 14, 1953 |

FOREIGN PATENTS

| 192,053 | Germany | Dec. 3, 1907 |